May 16, 1950  F. M. THURSTON ET AL  2,508,306
SAFETY PIPE JOINT
Filed May 5, 1945  2 Sheets-Sheet 1
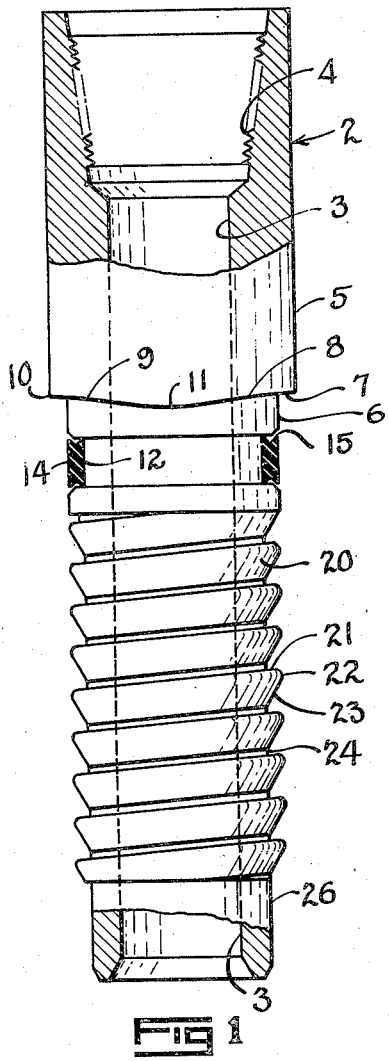
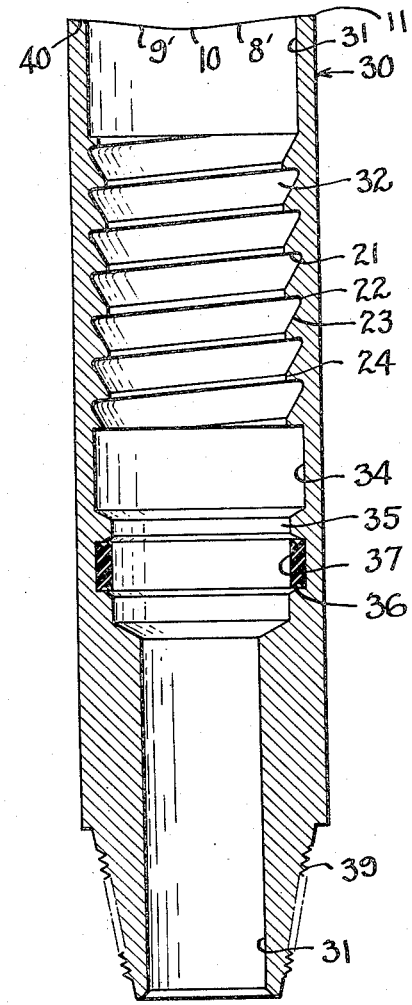
FRANK M. THURSTON.
GEORGE E. JUSTICE.
INVENTORS
BY Lester B. Clark
& Ray L. Smith
ATTORNEYS.

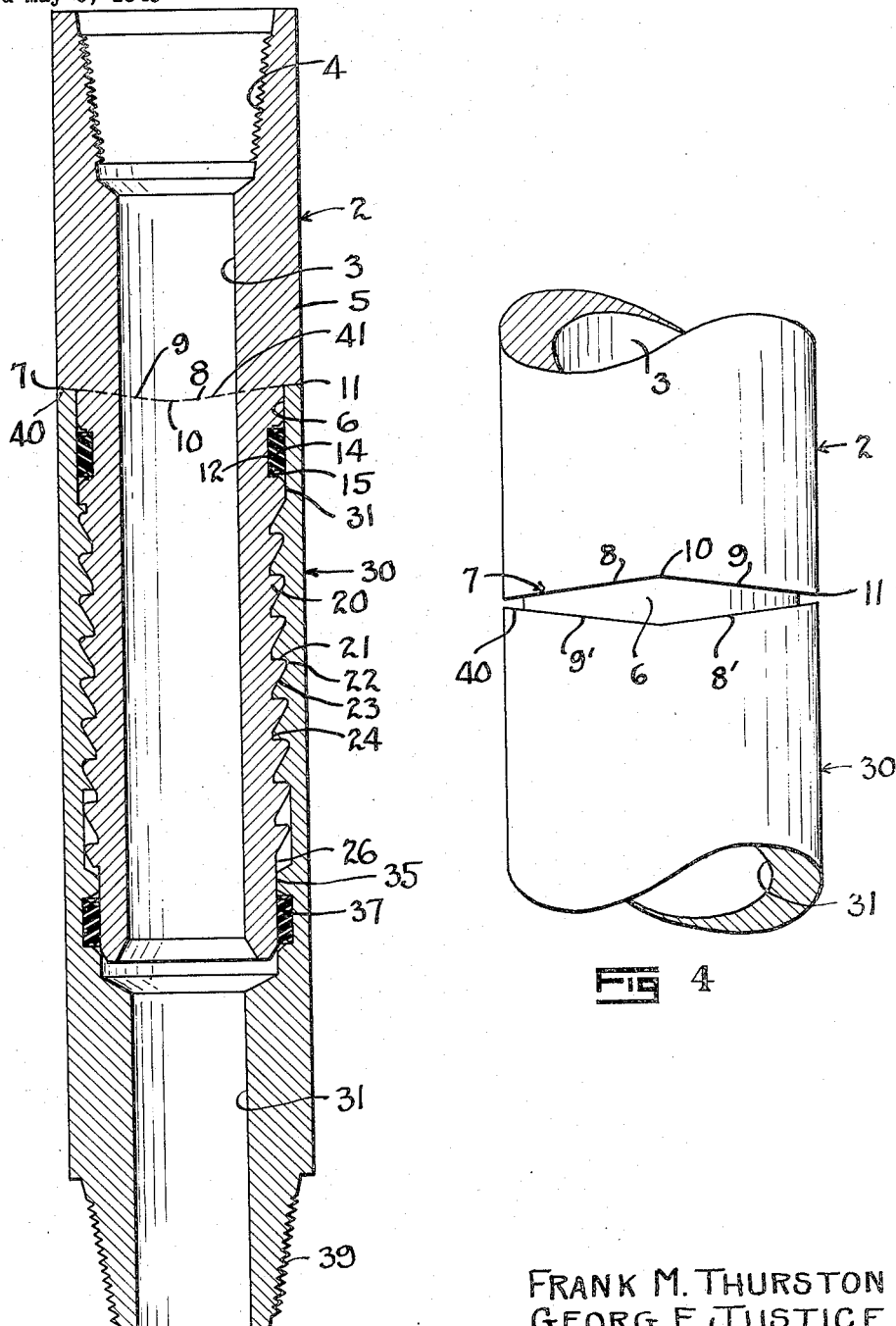

Patented May 16, 1950

2,508,306

UNITED STATES PATENT OFFICE 2,508,306

SAFETY PIPE JOINT

Frank M. Thurston and George E. Justice, Houston, Tex., assignors to Houston Oil Field Material Company, Inc., Houston, Tex., a corporation of Delaware Application May 5, 1945, Serial No. 592,180

3 Claims. (Cl. 285—146)

1

The invention relates to what is generally known as a safety joint and constitutes a pipe connection to be inserted into a string of pipe.

The present application is a continuation in part of our previous safety joint application for patent, Serial Number 419,436, filed November 17, 1941, which became abandoned.

A safety joint is usually provided in a string of pipe so as to assure the operator that when he attempts to unscrew the portion on one side of the safety joint from the portion on the other side, that the unscrewing or disconnecting of the pipe will occur at the safety joint rather than at some other threaded connection.

Safety joints are usually utilized in drill pipes used in the rotary method in drilling wells and must be of very sturdy construction so as to transmit the same torque which is applied to the drill pipe on the one hand and to carry the load of the pipe, drill bit, and drill collar positioned below it on the other hand. These conditions must be met while providing a threading connection which will release upon reverse rotation of the pipe.

The conditions to be met by a safety joint therefore are quite exacting in that it must make up tightly so that it will not jar loose during the normal operation and will transmit the torque and the load but wihch will not lock itself to the extent that the other threaded connections become locked or made up tightly.

It is therefore one of the objects of the invention to provide a safety joint which will release when under strain and through which the load of the pipe therebelow may be readily transmitted.

Another object of the invention is to provide a pipe joint which will have a large area of contact between the two members thereof so as to transmit the load below the joint.

Still another object of the invention is to provide a safety pipe joint having a buttress type of thread with a large substantially radial upper face so as to transmit the load without any wedging action which tends to increase the chances of the joint releasing.

Another object of the invention is to provide a safety joint wherein the threaded area is filled with a lubricant and sealed against the entry of mud or other foreign matter so as to facilitate the release of the joint.

A still further object of the invention is to provide a safety joint having a combination of a buttress thread which will transmit the load without any wedging action and a stop shoulder to limit the tightening action of the joint.

2

Other and further objects of the invention will be readily apparent when the following description is considered in connection with the accompanying drawings, wherein—

Fig. 1 is a side elevation of the pin member, certain parts shown in section and illustrating the construction thereof.

Fig. 2 is a vertical sectional view through the pin member, illustrating the arrangement of the threads and internal structure.

Fig. 3 is a vertical sectional view of the tool made up and in operating position.

Fig. 4 is a side elevation illustrating the arrangement of the stop shoulder when the pin member is approximately one-quarter of a turn from stopping position.

In Fig. 1 the pin member 2 is in the form of a section of pipe having the passage 3 therethrough and the internal threaded area 4 to receive the next section of pipe of the drill stem or other string of pipe into which the safety joint is to be incorporated.

This pin member 2 has the principal body portion 5 thereof reduced in diameter to provide a circumferential surface 6 which is defined by a shoulder 7 best seen in Fig. 4. This shoulder is circumferential in that it runs around the entire body but it has the two upper inclined surfaces 8 and the two downwardly inclined surfaces 9 which merge in the upper apex 10 and the lower apex 11.

The circumferential surface 6 is recessed at 12 and a packing or seal ring 14 is disposed in this recess. This seal ring may be the lip construction 15 at each end thereof so that pressure flowing against the ring will tend to force it to sealing position against the base of the recess and against any external surface.

The surface 6 then merges with the threaded area 20 which is of particular construction in that it is made up of a coarse buttress type of thread wherein each thread has a substantially radial upper surface 21, a rounded corner 22 and the lower inwardly tapered surface 23.

The respective threads may or may not be spaced apart by a short cylindrical surface 24.

This type of thread is of particular advantage in that when the pipe string becomes stuck in the well, the first effort of course is to pull it loose from its stuck position by a direct upward pull and the strain is thus taken on the pipe string as a whole. This strain or load is transmitted through the safety joint by engagement of the surface 21 of the threads on the members. Particular attention is directed to the fact that the surface 21 is flat and that it is substantially radial or normal to the axis of the pipe so that when this strain is taken on the joint there is no wedging action which would tend to prevent the joint from unscrewing. Of course there is some friction on the surface 21 against its complementary surface 21' in the female or box member but this friction is not augmented in any way by any wedging action.

Below the threaded area 20 is a lower circumferential surface 26 which forms the lower end of the pin member.

The box member 30 best seen in Fig. 2 has the upper circumferential surface 31 thereof which is directly above the threaded area 32. This threaded area 32 is the complementary thread portion to the thread 20 on the pin member 2 in that it has the flat upper surface 21, the rounded corner 22, and the tapered portion 23 and the short cylindrical area 24. These match identically with the male portions on the pin members so that as seen in Fig. 3 the joint may be made up tightly to transmit the load through the joint. Below the threaded area 32 in the pin member is a recess 34 which is reduced somewhat to provide the lower circumferential area 35. This area is recessed at 36 to receive a seal ring 37 which is identical with the ring 14 on the pin member. The box member has the lower threaded pin 39 which is arranged to connect to the pipe string therebelow.

The safety joint is shown in Fig. 3 as having been made up and in operative position, but of course the additional pipe to be screwed into the upper and lower ends respectively is not shown.

In making up the joint to assume the position of Fig. 3, the pin member of Fig. 1 is inserted in the box member of Fig. 2 and rotated to the position of Fig. 4. During this movement the surface 26 moves to the surface 35 so that the seal ring 37 bears against the circumferential surface 26 as best seen in the lower portion of Fig. 3. Above the threaded area the circumferential surface 6 moves into the circumferential surface 31 of the pin member so that the seal ring 14 bears against such surface 31 as best seen in the upper portion of Fig. 3. In this position the packing or sealing rings are confined and any pressure from either the threaded area between the seal rings or from either above or below the seal rings is resisted and tends to expand the seal rings to prevent a flow of fluid thereby.

It seems obvious that the parts of the threaded areas may be thickly coated with lubricant as they are inserted in position so that any space between the seal rings will be substantially filled with lubricant or if desired a suitable injection inlet may be provided for the introduction of lubricant or sealing material. The presence of such material in the joint prevents the entrance of any foreign matter such as sand or any abrasive material which might deter the releasing of the joint.

The joint is now fully made up by turning the parts a quarter of a turn from the position of Fig. 4 so as to bring the shoulder 9 against a complementary shoulder 9' on the upper end 40 of the pin member. The shoulder 8 in a like manner moves inwardly close to the shoulder 8' so that there is a complete closure shown by the dotted line 41 in Fig. 3.

This stop shoulder serves to prevent any further making up of the threaded joint and serves to transmit the torque from the pin member to the box member so that the safety joint serves as a driving connection in the string of pipe.

One of the substantial advantages of the present safety joint is the fact that the torque is transmitted by the shoulder 7 while the load is transmitted by the buttress thread. In this manner the thread does not have to transmit any torque and the shoulder does not have to transmit any load. Each performs its own function and is constructed for that purpose.

In event the joint is to be unscrewed the operator merely turns the upper portion of the pipe in a counter-clockwise direction and the joint will readily release and can be unscrewed so that the operator knows that his pipe is releasing at a definite point. This safety joint is intended and does release rather than the release of the threaded area such as 4 or 39 where the joint is connected to the adjacent sections of pipe.

Broadly the invention contemplates a safety joint which is made up and transmits torque without any wedging action and which can be readily unscrewed while under a strain or carrying a load because the threaded areas are not wedged in position by such strain or load.

What is claimed is:

1. A safety pipe joint comprising a box member and a pin member, cooperating coarse threads in said box member and on said pin member, said threads having a substantially radial upper face, a rounded edge, a tapered lower face, and a circular portion between and spacing adjacent threads so that the joint may be readily unscrewed while under tension and the radial upper face serves to transmit the load through the joint from one member to the other.

2. A safety pipe joint comprising a box member and a pin member, cooperating coarse threads in said box member and on said pin member, said threads having a substantially radial upper face, a rounded edge, a tapered lower face, and a circular portion between and spacing adjacent threads so that the joint may be readily unscrewed while under tension and the radial upper face serves to transmit the load through the joint from one member to the other, and complementary stop shoulders on said members to limit the tightening movement.

3. A safety joint comprising complementary box and pin members, said box being internally threaded with a coarse buttress type female thread having an upper flat load transmitting face, said pin having a complementary identical male thread, said members each having complementary circumferential surfaces at each end of the threaded area, an annular recess in one of each pair of surfaces of each member, and a resilient lip type of seal ring in each recess to be abutted by the complementary circumferential surface so as to form a seal at each end of the threads which is adapted to retain a lubricant in the joint.

FRANK M. THURSTON.
GEORGE E. JUSTICE.

REFERENCES CITED

The following references are of record in the file of this patent:

UNITED STATES PATENTS

| Number | Name | Date |
|---|---|---|
| 646,597 | Bullock | Apr. 3, 1900 |
| 1,573,862 | Raber | Feb. 23, 1926 |
| 1,590,357 | Feisthamel | June 29, 1926 |
| 2,196,966 | Hammer | Apr. 9, 1940 |